United States Patent [19]

Chiu

[11] 4,263,810
[45] Apr. 28, 1981

[54] ANGULAR DEFLECTION SENSING APPARATUS FOR LOAD, FORCE, AND OTHER TYPES OF MEASUREMENTS

[76] Inventor: Hong-Yee Chiu, 71 Chestnut St., Englewood, N.J. 07631

[21] Appl. No.: 884,557

[22] Filed: Mar. 8, 1978

[51] Int. Cl.$^3$ ............................................. G01B 11/16
[52] U.S. Cl. ...................................... 73/800; 250/225; 350/407
[58] Field of Search ...................... 73/141 A, 705, 800, 73/DIG. 11; 33/1 L, 125 A, DIG. 3; 177/DIG. 6; 350/159; 356/152, 370; 250/225, 231 R, 231 P

[56] References Cited

U.S. PATENT DOCUMENTS

| | | | |
|---|---|---|---|
| 3,308,303 | 3/1967 | Weichselbaum et al. | 250/231 P |
| 3,596,100 | 7/1971 | Hollick | 250/225 |
| 3,775,617 | 11/1973 | Dubauskas | 250/231 R |

OTHER PUBLICATIONS

L. T. Lemke–IBM Technical Disclosure Bulletin–vol. 12, No. 5, Oct. 1969, p. 692.

Primary Examiner—Charles A. Ruehl

[57] ABSTRACT

A method and apparatus of measurement of angular deformation of a body, and in particular, a method and apparatus of load or force sensing are disclosed. Chief applications are found in electronic weighing and related devices. Deformation of a body in the form of angular deflection, or a deformation that can be transformed into angular deflection by mechanical or other means, changes the angle between the polarization axes of a pair of light polarizers, thus changing the intensity of light that is transmitted through the pair of polarizers. A photodetector converts the transmitted light into an electric signal. This signal contains information regarding the amount of deformation of the body and may be used in its analog form to operate a voltmeter to give a visual readout, or converted into a digital form for activating a visual digital display, or for inputing into a digital data processing device. A specially designed feedback-stabilized light source produces an output whose D.C. level stays constant regardless of variations in certain of the properties of the photodetectors and the light source.

8 Claims, 16 Drawing Figures

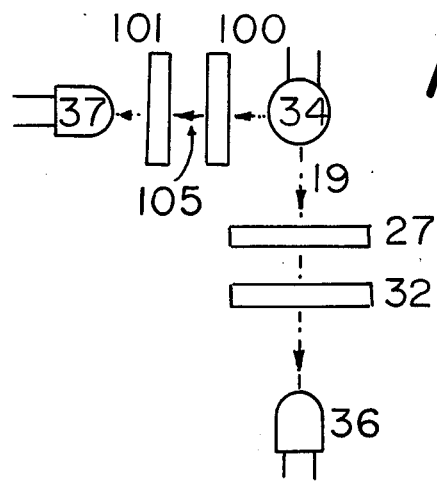
*FIG.10A*
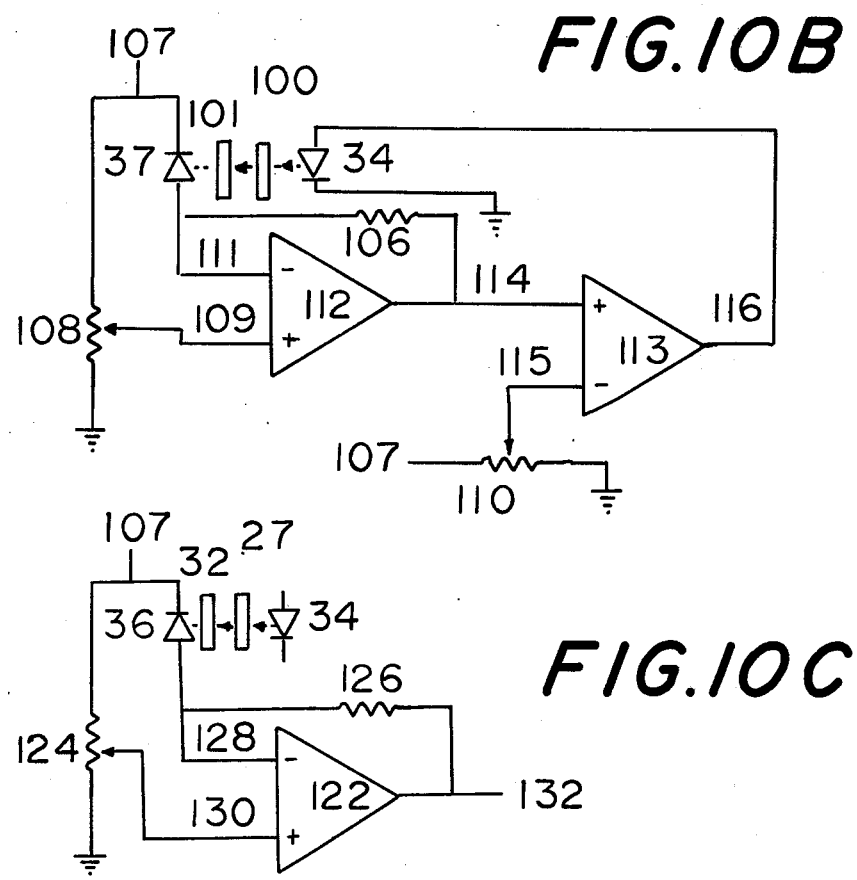
*FIG.10B*
*FIG.10C*

ANGULAR DEFLECTION SENSING APPARATUS FOR LOAD, FORCE, AND OTHER TYPES OF MEASUREMENTS

BACKGROUND OF THE INVENTION

This invention is an apparatus for the measurement of the bending and torsion of a body, and, more generally, the deformation of an elastic or inelastic body induced by the application of a load or force, or by other causes, as long as the induced deformation is in the form of angular deflections, or is in such a form that it may be converted into an angular deflection. An electrical output is generated which is mathematically related to the magnitude of the load or force. In essence, this invention is a new type of strain gage which can be used as a low-cost, accurate load transducer or load cell. A principal application is in electronic weighing devices.

The most common type of strain gage measures the strain in a body by measuring the changes in the electrical resistance of a deformable resistor, which is adhered to the body at a location where strain exists. Strain in the body deforms the resistor, changing its resistance. The change in resistance is converted into an electrical signal via a bridge circuit with an external excitation electromotive force (e.m.f.). Since the amount of deformation associated with strain is usually small, the output signal is also small (the signal under maximum load is usually much less than 1% of the excitation e.m.f.). Painstaking efforts must also be undertaken in the fabrication of this type of strain gage in order to eliminate temperature and other effects. The cost of this type of strain gage is usually high.

SUMMARY OF THE INVENTION

In order to increase the output signal of the measuring device, thereby increasing precision and accuracy, and to reduce production cost, I propose the following apparatus for the measurement of the deformation of a body, such as the bending of a beam or the torsion of a bar, or the bulk deformation due to pressure, shear, force, etc. Two light polarizers, designated as M and N, are placed adjacent and parallel to each other to control the amount of light from a source that falls upon a photodetector. Angular displacement applied to one, or both, of the two polarizers changes the relative angle $\phi$ between the axes of polarization of M and N; the intensity of the transmitted light varies as the function $\cos^2 \phi$. For simplicity, first consider the case where one of the two polarizers, say, N, is now attached to a certain part of the body undergoing deformation. Under an external force or load this body will deform. In most cases the deformation includes an angular deflection at the said part of the body. This angular deflection is transmitted to the polarizer N, via a mounting bracket or device, to cause the polarization axis of N to rotate by an angle $\theta$, so that the angle between the polarization axes of M and N will change from the no-load value of $\phi$ to the withload value of $(\phi+\theta)$; the intensity of the transmitted light will then change from $\cos^2 \phi$ to $\cos^2 (\phi+\theta)$. If $\theta$ is small, the change in intensity is proportional to $(d/d\phi)\cos^2 \phi \cdot \theta = -2 \cos \phi \sin \phi \cdot \theta$, which is linearly dependent on $\theta$. The range of linearity depends on the geometry of the polarization axes and the required accuracy. The maximum range of linearity obtains when the function $\sin \phi \cos \phi$ undergoes a maximum at $\phi = 45°$ or $\pi/4$ radians.

Although in the case discussed only one of the polarizers is attached to the body undergoing deformation, in many cases it is feasible or preferable to attach both polarizers to different parts of the same body such that a deformation will introduce a change in the relative angle of the two polarization axes.

It should be noted that the operation of this device is associated with deformation of a body, or bodies, without regard to the cause of deformation itself. The configuration of the body is immaterial, nor must the deformation be limited to one single body: Relative deformation of two bodies can be measured in a similar manner. The deformed body may be a cantilever beam clamped at one end, or a beam supported at both ends, or a beam clamped at one end and supported at the other, or a beam or plate, of any shape, that will deform under certain external influences which may be a load or a force. This body may be a bimetal strip and the cause of change of bending may be temperature changes; in such a case the apparatus functions as a thermometer. This body may be a sealed bellow and the cause of deformation may be pressure changes; in such a case the apparatus functions as a barometer.

Being a light-activated device, this apparatus is sensitive to the condensation of water vapor or other vapors on the optical surfaces, including the light source, light polarizers, and photodetectors. The reliability of operation is also sensitive to the accumulation of dust over all optical surfaces. In order to render this apparatus immune to these effects, the optical surfaces must be effectively sealed against the attack or influence of moisture and dust, without affecting its accuracy and sensitivity. Some configurations are more easily sealed off against moistures and dust accumulation than are others.

A photodetector is used to convert the change in intensity of light due to deformation into an electric signal. An ideal photodetector that fulfills the purpose must possess the following qualities: (a) Its output must strictly be linear with respect to the amount of light it receives. (b) Its sensitivity to light must remain constant in the course of time. (c) Its response must be reasonably fast, i.e., it must have a time constant that is small compared to the time allowed for measurement to take place. (d) It must not have a "memory" or "hysteresis effect", i.e., its output must not depend on the previous history of exposure to light. (e) Its "dark current", defined as its response in the absence of light, must be small. (f) Temperature must have negligible effects on both sensitivity and dark current. Among available detectors, the photodiode, which is a silicon p-n junction specially processed for sensitivity to light in the 4,000 Å to 10,000 Å wavelength range, comes closest to being an ideal light detector. Nevertheless, the dark current still varies with temperature, as does the sensitivity, although the variation of sensitivity as a function of temperatures is much less than that of the dark current.

Commonly available miniature light sources include incandescent light sources and light emitting diodes (LED) which emit light in narrow bandwidths of wavelengths, with central wavelengths between 6,000 Å and 9,500 Å. Incandescent light sources emit a broad spectrum of light (black body radiation) from 3,500 Å to well over 10,000 Å. Such a source has a short lifetime and is particularly susceptible to the effect of aging (its light output generally decreases with time). Moreover, its chief radiation is beyond 8,000 Å. Light of wavelengths greater than 8,000 Å directly penetrates some synthetic polarizer material without being polarized. Unless a wavelength-selecting filter or a polarizer that will polarize near infrared light is used, incandescent light appears to be a poor choice. It is found that LEDs which emit light at wavelengths below 8,000 Å comprise the most nearly ideal light source. However, at a rated power, LED light output depends on the ambient temperature.

In view of the dependence of photodetector characteristics upon temperature, in order to maintain an output of a stable D.C. level, a constant light source is not the answer. In fact, it is only necessary that the light source-photodetector combination be able to compensate for such changes as may cause the output to vary, such as aging of components and temperature variations. A specially designed feedback light source-photodetector system is developed to compensate for tempeature variations and other changes that might affect the output level.

DESCRIPTIONS OF THE DRAWINGS

Advantages and features of the invention are made clear in the following descriptions, relating to the accompanying drawings wherein.

FIGS. 10A, 10B, and 10C show an embodiment whereby the light source-photodetector combination will yield a stable output.

DESCRIPTION OF THE OPERATION

Figure 1:
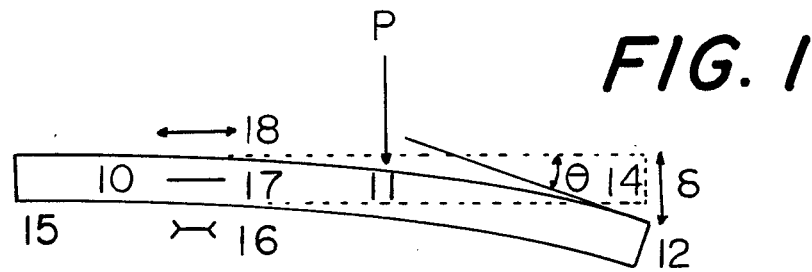
FIG. 1 shows the bending parameters of a cantilever.

FIG. 1 shows the bending parameters of a cantilever. A load or force P is applied to a cantilever 10 at a point 11, causing the cantilever to flex. Let $\delta$ be the linear displacement of the free end point 12 from its no-flex position as indicated by the dashed graphics, 14, and let $\theta$ be the angle of deflection (the angle between the tangent to the surface at 12 and that in the configuration 14). The flexure also induces a general strain condition (shown as highly exaggerated dimensional changes indicated by bi-directional arrows 16 and 18 with respect to the neutral plane 17) between the support point 15 and the load point 11, but the amount of strain is usually greatest near the support 15. The strain, the angular deflection $\theta$, and the linear displacement $\delta$ are all related to each other and are all directly proportional to the load or force P. Conventional resistive type strain gages sense the strain, which is greatest near 15.

Figure 2:
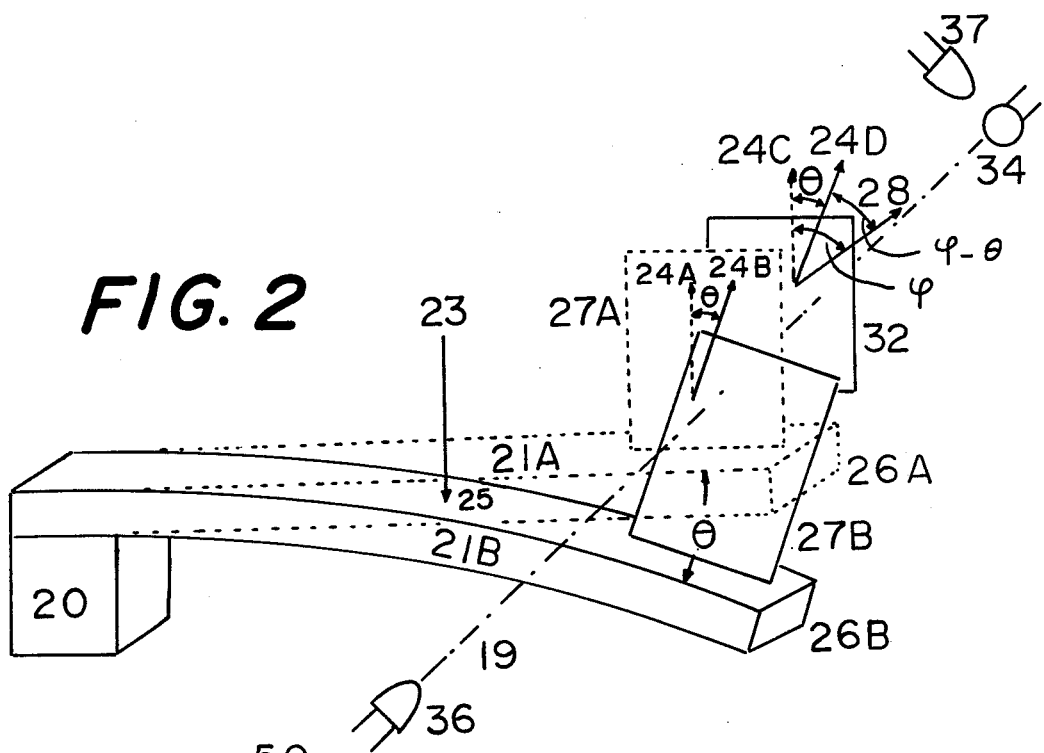
FIG. 2 shows the embodiment for the measurement of the angle of deflection of a cantilever under flexure.

FIG. 2 shows an embodiment for the measurement of the angle of deflection $\theta$. Dotted graphics and numerals with the suffix A denote the configuration before flexure, and solid line graphics with the suffix B denote the configuration after flexure. One end of a cantilever 21 is clamped onto a support 20. A light polarizer 27 is mounted on the cantilever. A load 23 is applied to the cantilever at a point 25 to induce flexure, and the configuration of the cantilever changes from the A to the B configuration and the surface of the cantilever near the end point 26B makes an angle $\theta$ with respect to that in the A configuration (26A). The polarization axis 24 of the polarizer 27 rotates by the same angle $\theta$ in the transition from the A to the B configuration (24A to 24B).

A light polarizer 32 is mounted in a stationary manner with respect to the support 20, parallel and close to the polarizer 27 but without hindering the movement of 27. In the A configuration the polarization axis 28 of 32 makes an angle $\phi$ with the polarization axis 24A which is transposed onto 32 as 24C. In the B configuration, 24A becomes 24B, which is transposed onto 32 as 24D, and the angle $\phi$ changes into the angle $(\phi-\theta)$. Light from a source, 34, after passing through the pair of polarizers 32 and 27, will suffer an attenuation, and the intensity of the transmitted light is proportional to $\cos^2 \phi$ in the A configuration and to $\cos^2 (\phi-\theta)$ in the B configuration. The transmitted light, as received by a photodetector of linear response 36, produces an electric signal $\epsilon$ such that $$\epsilon(\phi) = K \cos^2 \phi \text{ (A configuration)}$$

$$\epsilon(\phi-\theta) = K \cos^2 (\phi-\theta) \text{ (B configuration)} \tag{1a}$$

where K is a constant of proportionality.

In FIG. 2 the load or force 23 is acting in the downward direction. However, it is the component normal to the surface of the cantilever that causes flexure. Likewise, this load or force may be directed upward and the operation of the embodiment will remain identical, except that the sign of $\theta$ will now be reversed. Further, as is clear from the operation, the position of the polarizer 27 is also immaterial: The polarizer 27 may be placed below the cantilever 21, with the optical axis 19 displaced to run below the cantilever 21 accordingly.

It should also be noted that the cause of flexure is also immaterial. It is the flexure of the cantilever that is being measured. Hence the cantilever 21 may be replaced by a bimetal bar, for example. The flexure of the bar will then indicate the thermal state of the bimetal bar.

Figure 3:
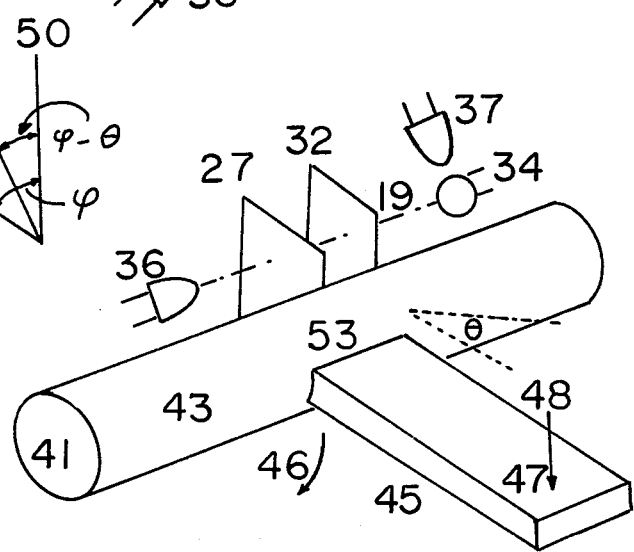
FIG. 3 shows the embodiment for the measurement of the torsional deformation of a bar of circular cross-section.

FIG. 3 shows another embodiment of the invention wherein the body subject to deformation is a bar of circular cross-section 43. For simplicity, supports which affix one or both ends of the bar 43 are not shown. A force or load 48 is applied to a connecting lever 45, at a load point 47. The connecting lever 45 converts the load or force 48 into a torque 46 which produces torsion of the bar by an angle $\theta$ at a point 53, where a light polarizer 27 is affixed. As a result of torsion, the axis of polarization of the polarizer 27 rotates from the original position 51 to the torsioned position 52, and the angle of rotation is also $\theta$. A light polarizer 32 is mounted so as to be stationary with respect to the support of the bar 43, parallel and close to the polarizer 27 but without hindering its motion. The angle between the polarization axis 50 of the polarizer 32, and that of 27 is φ before the load 48 is applied and (φ−θ) after the load is applied. Light from a source 34, after passing through the pair of polarizers 32 and 27, will suffer attenuation. The intensity of the transmitted light is proportional to $\cos^2 \phi$ and to $\cos^2(\phi-\theta)$ before and after the load is applied, respectively. The transmitted light, as received by a photodetector 36, will generate a signal that is proportional to $\cos^2 \phi$ and $\cos^2(\phi-\theta)$, respectively, as in the case of a cantilever, and is described by the same two equations of (1a).

Figure 4A:
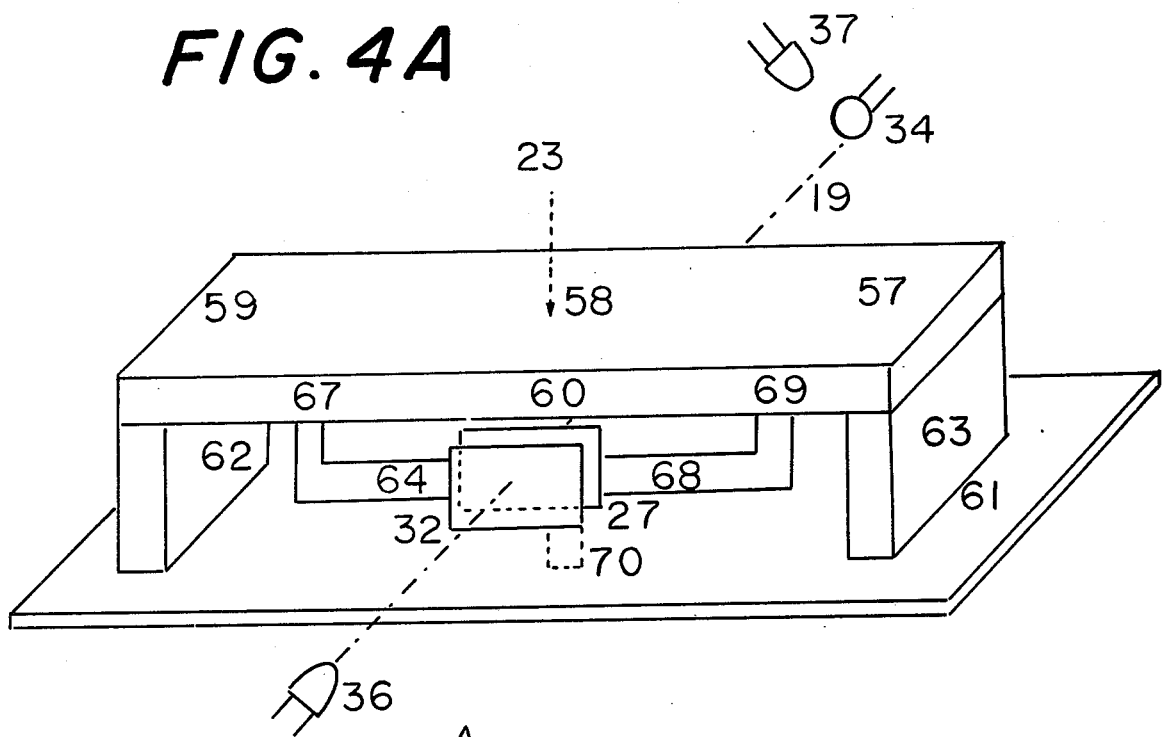
FIGS. 4A and 4B show another embodiment whereby bending of a beam supported at both ends, or supported at one end and clamped at the other, is measured.
Figure 4B:
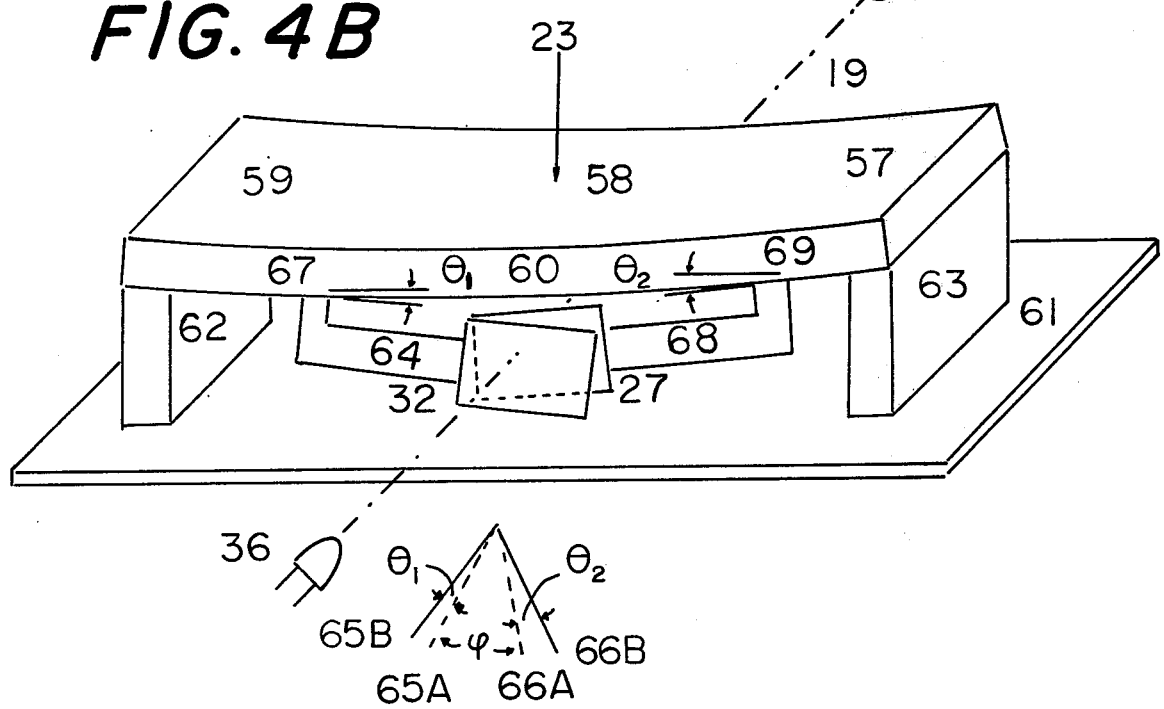

FIGS. 4A and 4B show another embodiment whereby a beam 60 is supported at both ends 57, 59 (or alternatively, is supported at one end and clamped at the other) via two supports 62, 63. Two polarizers 27, 32 are attached to the beam 60 via two mounting brackets 64, 68 which are mounted onto the beam 60 at points 67 and 69, respectively. FIG. 4A shows the configuration without flexure, and the two polarization axes 65A and 66A (of polarizers 32 and 27, respectively) make an angle φ. FIG. 4B shows the flexed configuration. As shown, the cause of flexure is a load 23 applied at a point 58. In the flexed configuration the tangents to the beam 60 at the mounting points 67, 69 make angles $\theta_1$, $\theta_2$ with respect to the tangents to the beam 60 at the same points 67, 69 before flexure. The polarization axes now assume the new positions 65B and 66B, respectively, and the new angle between the polarization axes is $\phi'=\phi+\theta_1+\theta_2$. The intensity of light I that originates from a source 34, after passing through the set of polarizers 32 and 27, as received by the photodetector 36, will generate electric signals of the magnitudes:

$\epsilon(\phi)=K \cos^2 \phi$ (FIG. 4A configuration)

$\epsilon(\phi')=K \cos^2 \phi' = K \cos^2(\phi+\theta_1+\theta_2)$ (FIG. 4B configuration)      (1b)

where K is a constant of proportionality.

As stated previously, one of the two polarizers need not be mounted on the beam 60 as shown. For example, the polarizer 32 may be mounted on the platform 61 on which the supports 62, 63 are mounted via a bracket 70.

Figure 5A:
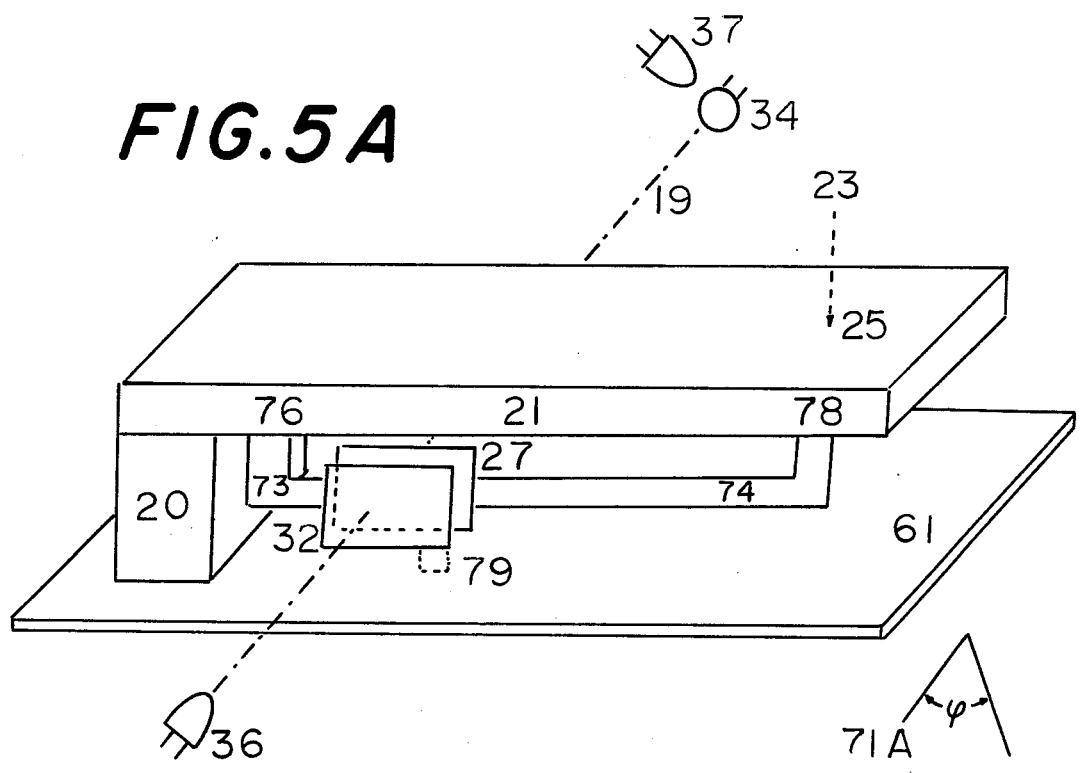
FIGS. 5A and 5B show yet another embodiment whereby bending of a cantilever is measured.
Figure 5B:
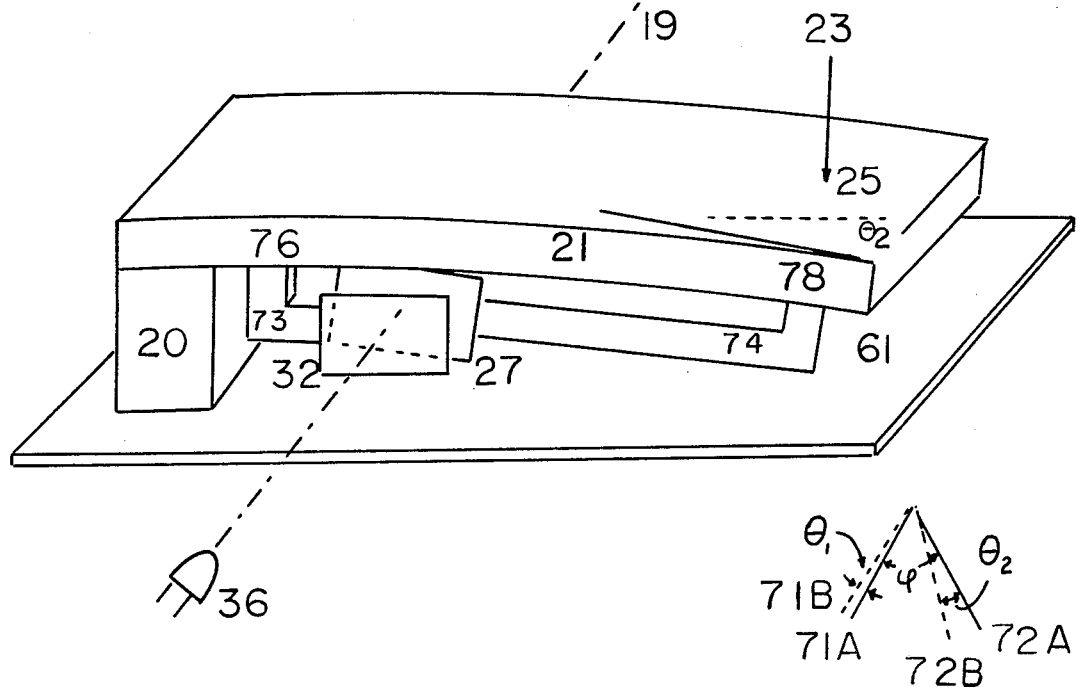

FIGS. 5A and 5B show an embodiment similar to those in FIGS. 4A and 4B, except that one of the supports is removed and the other end of the beam is clamped at the remaining support to become a cantilever. Two polarizers 32 and 27 are mounted onto the cantilever 21 via brackets 73, 74, which are mounted at points 76, 78, respectively. FIG. 5A shows the configuration without flexure whereas FIG. 5B shows the flexed configuration. As shown, the flexure is due to the application of a load 23 at a point 25. In the flexed configuration (FIG. 5B) the tangents to the beam at 76, 78 make angles $\theta_1$, $\theta_2$ with respect to the respective tangents at the corresponding points in FIG. 5A. The polarization axes 71A, 72A of the polarizers 32, 27 in FIG. 5A, rotate by angles $\theta_1$, $\theta_2$ to become 71B, 72B in FIG. 5B, and the angle between the polarization axes changes from φ to φ' correspondingly, where $\phi'=\phi-(\theta_2-\theta_1)$. Thus, the intensity of light I that originates from the source 34, after passing through the set of polarizers 32 and 27, and being received by the photodetector 36, will generate electric signals of magnitudes:

$\xi(\phi) = K \cos^2 \phi$      (FIG. 5A)      (1c)
$\xi(\phi') = K \cos^2 \phi'$ $= K \cos^2[\phi - (\theta_2 - \theta_1)]$      (FIG. 5B)

where K is a constant of proportionality.

As in the case of FIGS. 4A and 4B, one of the polarizers, say 32, need not be mounted on the cantilever. Instead, a bracket 79 may be used to fix the polarizer 32 onto the platform 61 on which the support 20 is mounted.

Figure 6:
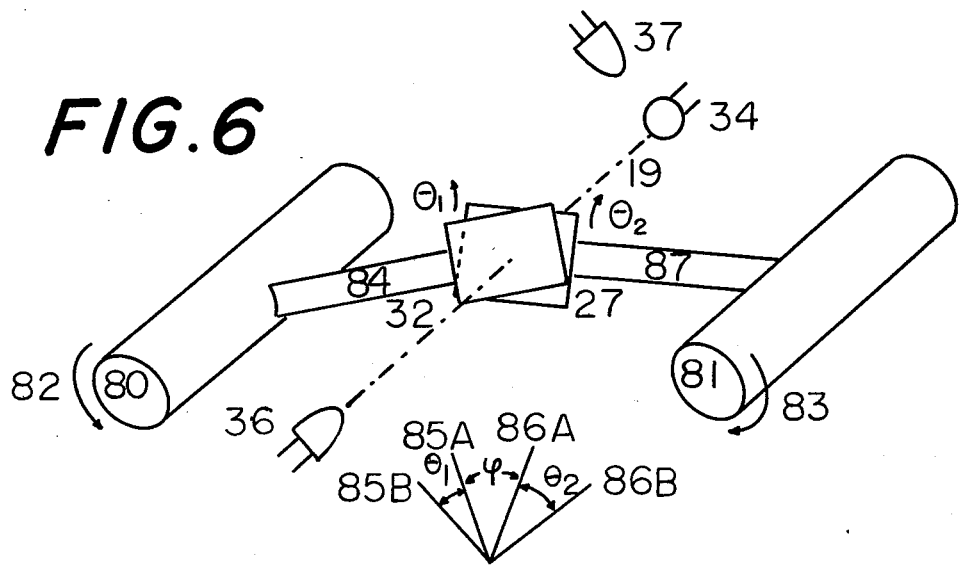
FIG. 6 shows an embodiment whereby the sum of the torsional deformations of two shafts is measured.

FIG. 6 shows an embodiment where the sum of two torques 82, 83 applied to two shafts 80, 81 is measured in terms of the torsions over angles $\theta_1$, $\theta_2$, which are transmitted to the two polarizers 32, 27 via mounting brackets 84, 87. Before the torques 82, 83 are applied, the polarization axes 85A, 86A of polarizers 32, 27 make an angle φ with respect to each other. After the torques 82, 83 are applied, the axes 85A and 86A rotate by angles $\theta_1$, $\theta_2$ respectively to become 85B, 86B, and the new polarization axes make an angle $\phi'=(\phi+\theta_1+\theta_2)$ with respect to each other. Again the intensity of light, I, that originates from a source 34, after passing through light polarizers 32 and 27 and being received by the photodetector 36, will generate electric signals of magnitudes:

$\epsilon(\phi)=K \cos^2 \phi$ (torques 82, 83 are not applied)

$\epsilon(\phi')=K \cos^2 \phi' = K \cos^2(\phi+\theta_1+\theta_2)$ (after application of torques 82,83)      (1d)

It may be noted that in this embodiment the result of intensity changes represents the sum of torques from two sources.

Figure 7:
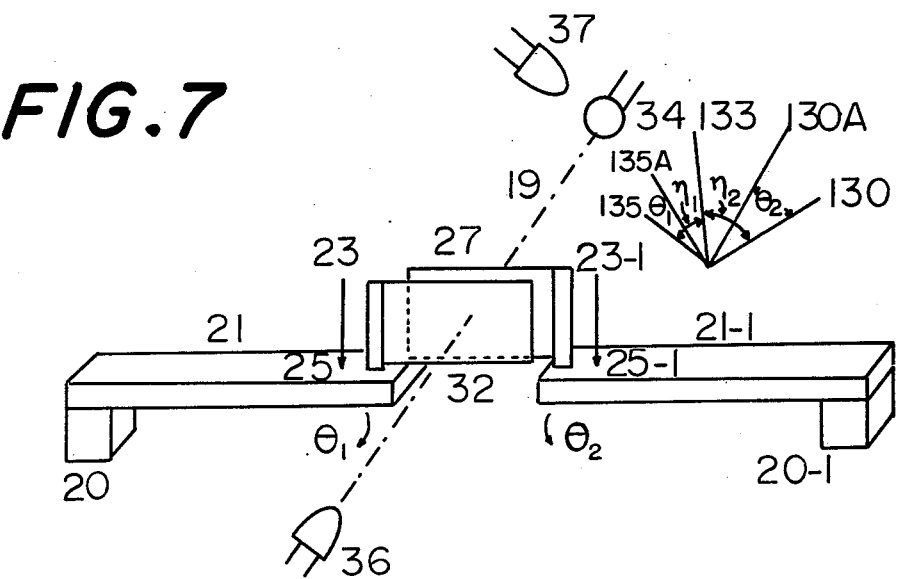
FIG. 7 shows an embodiment whereby the sum of bendings of two cantilevers is measured.

FIG. 7 shows an embodiment whereby the sum of bendings of two cantilevers is measured. A first force or load 23 applied to a load point 25 of a first cantilever 21, which is clamped at one end onto a support 20, will induce bending of the cantilever 21. This will cause the polarization axis 135 of a polarizer 32 mounted near the free end of the cantilever 21 to rotate by an angle $\theta_1$ to assume the position 135A. The angular position of the polarization axis 135 may be defined by reference to an arbitrary direction 133 fixed with respect to the support 20. As will become clear from the following discussions, the actual direction of this reference direction is immaterial. For convenience, choose 133 to be normal to the plane of the cantilevers 21 and 21-1 before flexure. Let the angle between 135 and 133 be $\eta_1$. After flexure, $\eta_1$ changes to $\eta_1-\theta_1$. Likewise, a second force or load 23-1 applied to a loading point 25-1 of a second cantilever 21-1 which is clamped at one end onto a support 20-1, will induce bending of the cantilever 21-1. This will cause the polarization axis 130 of a polarizer 27 mounted near the free end of the cantilever 21 to rotate by an angle $\theta_2$ to assume a new position 130A. The angle $\eta_2$ between 130 and the fixed direction 133 will now change to $\eta_2-\theta_2$. The angle between the two polarization axes 135 and 130 therefore changes from an initial angle $\phi=(\eta_1+\eta_2)$ to the angle $\phi'=(\eta_1+\eta_2)-(\theta_1+\theta_2)$. Since only the sum $(\eta_1+\eta_2)$ appears in the formulation, the choice of the direction of the axis 133 is immaterial, as long as it is contained in the plane of 135 and 130.

Light from a source 34, after passing through the pair of light polarizers 27 and 32, and being received by the first photodetector 36, will generate electrical signals of magnitudes:

$\epsilon(\phi)=K \cos^2 \phi$ (before flexure)

$$\epsilon(\phi')=K\cos^2\phi'=K\cos^2[\phi-(\theta_1+\theta_2)] \text{ (after flexure)} \quad (1e)$$

where K is a constant of proportionality.

In general, light is transmitted through different parts of the polarizers before and after a load or force is applied. However, as long as the polarizer has a homogeneous optical property, the intensity of the transmitted light is only dependent on the change of polarization axes and not on the exact location through which light passes. Light polarizers with homogeneous optical properties are produced economically.

Figure 8:
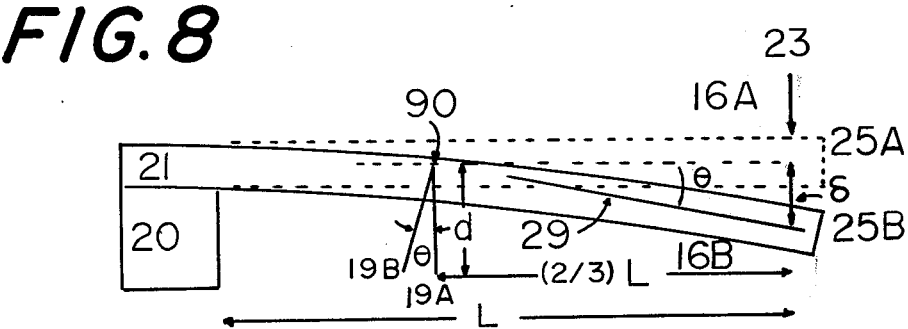
FIG. 8 shows how the relative movement of the polarizers with respect to the optical axis of measurement may be minimized in the embodiment shown in FIGS. 5A and 5B.

In the configurations shown in FIGS. 5A and 5B, however, it is possible to choose an appropriate location for the optical axis 19 to minimize the translational displacement of the polarizer against the optical axis. FIG. 8 shows a simplified schematic of FIGS. 5A and 5B, showing the appropriate deflection parameters. A load 23 is applied to a cantilever at a point 25A causing it to flex from the no-flexure configuration A to the flexed configuration B, and the amount of linear deflection from 25A to 25B is $\delta$, accompanied by an angular deflection of the tangent 29 to the beam at 25 by an angle $\theta$. From the theory of elasticity it is found that $$\theta = \delta/(\tfrac{2}{3}L) \quad (2)$$

where L is the length of the beam from the support 20 to the loading point 25. The tangent thus behaves as if it were pivoted around a point 90, which is $(\tfrac{2}{3})L$ away from the loading point 25. Thus, a light polarizer mounted at the point 25 will appear to rotate around the point 90, without any translational motion. In order to clear away from the beam 21, the optical axis 19 may be chosen to be at a small distance d away from the pivoting point 90. In this case only a small translational displacement $d\cdot\theta$ exists. By locating the optical axis 19 at a distance $(\tfrac{2}{3})L$ from the loading point, and as close to the beam 21 as is feasible, the translational motion of the polarizer undergoing angular deflection is minimized.

Generally speaking, this invention applies to the measurement of deformation of bodies of any composition and configuration, as long as the deformation results in angular deflection and as long as it is practical to attach a light polarizer to the body to sense angular deflection. The measurement is achieved by monitoring the intensity of light transmitted through a pair of light polarizers parallel and adjacent to each other in the no-load configuration. These polarizers measure the angular deflections resulting from deformation. Other types of deformation, e.g., linear elongation, may be converted into an angular deflection by simple mechanical devices such as a lever, arm, wheel, disk, hydraulic or aerodynamic linkage, etc. The resulting angular deflection can then be measured by the methods described above.

Since angular deflection belongs to the more general class of angular displacements, this invention is also applicable to the general measurement of angular displacements. Linear displacements may be measured after being converted, via mechanical means, into angular displacements.

Light polarizers are intrinsically nonlinear devices, i.e., the intensity of the transmitted light is not proportional to the angle between the two light polarizers, but is a highly nonlinear trignometric function of the angle. However, under certain favorable conditions a wide linearity region exists. From Eq. (1), an external load P will generate a difference signal $\Delta\epsilon(\theta)$ such that $$\Delta\xi(\theta) = \xi(\phi - \theta) - \xi(\theta) \quad (3)$$
$$= K[\cos^2(\phi - \theta) - \cos^2\phi]$$

Equation (2) may be expanded in Taylor's series at $\phi$ to yield:

$$\Delta\epsilon(\theta) = \tfrac{1}{2}K[\sin 2\phi\cdot 2\theta - \tfrac{1}{2}\cos 2\phi\cdot(2\theta)^2 - 1/6 \sin 2\phi\cdot(2\theta)^3 + \ldots] \quad (4)$$

(In Equations (3) and (4), $\phi$ and $\theta$ are measured in radians.) When $\phi = \pi/4$ radians (45 degrees), then $\cos 2\phi = 0$, $\sin 2\phi = 1$, and therefore $$\Delta\epsilon(\theta) = K(\theta - \tfrac{2}{3}\theta^3 + \ldots) \quad (5)$$

$\Delta\epsilon(\theta)$ is therefore approximately proportional to $\theta$. The maximum deviation from linearity occurs at a maximum deflection angle, say, $\theta_m$. The maximum fractional error is $(\tfrac{2}{3})\theta_m^2$. The most optimum range of operation of the polarizers as linear angular transducers is to have their polarization axes vary within a range of $(\phi \pm \theta_m)$ radians, with a maximum fractional error of $(\tfrac{2}{3})\theta_m^2$. For example, up to $\theta_m = \pm 0.12$ radians (or $\pm 7$ degrees), the deviation from linearity is less than 1%.

At other values of $\phi$ different from 45 degrees, a range of linear dependence of $\Delta\epsilon(\theta)$ on $\theta$ still exists, but the range of linearity is smaller.

Figure 9A:
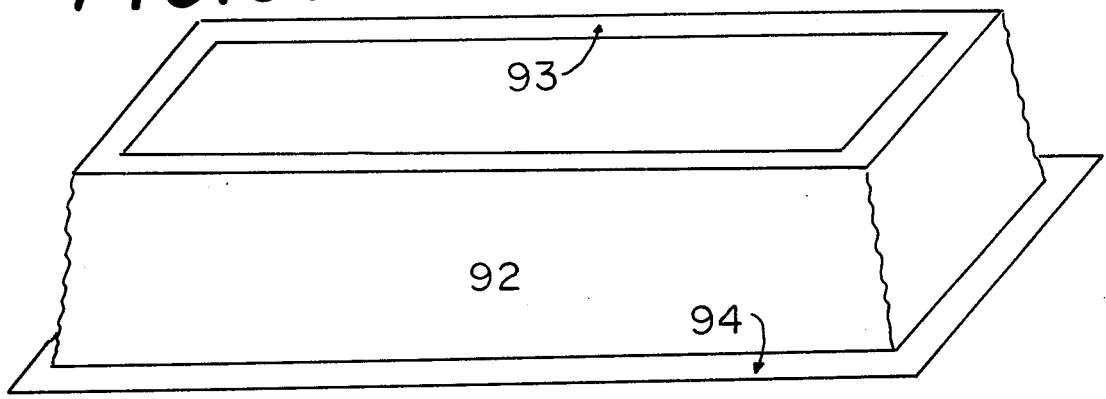
FIGS. 9A, 9B and 9C show how dust covers can most easily and effectively be accomodated in the embodiments shown in FIGS. 4A, 4B, 5A, and 5B.
Figure 9B:
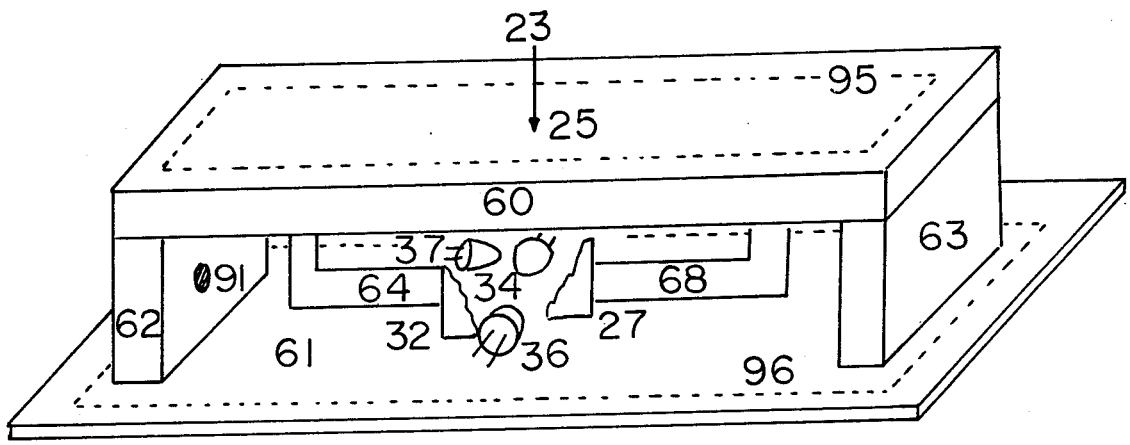
Figure 9C:
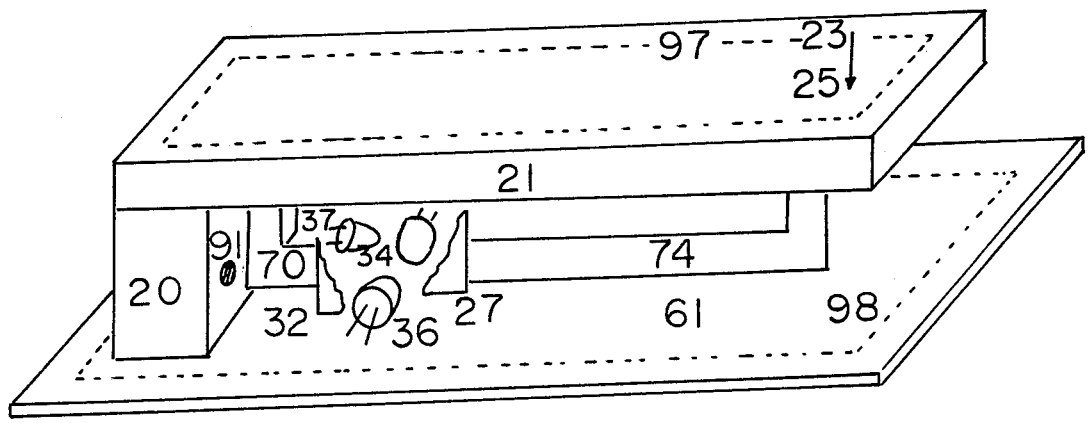

FIGS. 9A, 9B, and 9C show how the embodiments of FIGS. 4A and 4B and FIGS. 5A and 5B may be conveniently covered by a dust-proof and moisture-proof cover 92, which is shown in FIG. 9A. In these embodiments all sensing components are below the beam 60 of FIG. 9B or the cantilever 21 of FIG. 9C. By using a beam or cantilever of sufficient width, all components (light source 34, photodetectors 36 and 37, polarizers and their mounting brackets) may be placed within the boundaries of the beam or cantilever. A cover 92, made of light-proof, highly flexible material that is impervious to moisture, light and dust, with folded edges 93 and 94, can be used to cover completely the sensor assembly, as shown in FIG. 9B. The top folded edges 93 are sealed onto the edges 95 of the beam and the bottom folded edges 94 are sealed onto the platform at the rim of boundary of the beam, 96. If the cover fits snugly over the entire assembly, interference with measurement operations will be minimal. Meanwhile, a load 23 can still be readily applied to the loading point 25 to produce the desired flexure. Connecting wires may be passed through a hole 91 on a support, say, 62.

In a similar manner, the cover 92 fits the cantilever version of the embodiment shown in FIG. 9C. The top folded edges 93 are sealed onto the edges 97 and the bottom folded edges are sealed against the bottom boundaries 98 of the cantilever. A hole 91 in the support 20 allows passage of wires to components as mentioned above.

FIG. 10A shows the operation of a feedback-stabilized light source. Light from a source 34, after passing through a pair of light polarizers 32 and 27 whose polarization axes make an angle $\phi$, will suffer an attenuation which is proportional to $\cos^2\phi$. The transmitted light, when received by a photodetector 36, will generate an electric signal $\epsilon(\phi)$ of the magnitude:

$$\epsilon(\phi) = K\cos^2\phi \quad (1)$$

where K, the proportionality constant, depends on many factors of construction, including the optical properties of the polarizers, but primarily K is proportional to the intensity, I, of the light source 34. As described previously, if the two polarizers 27 and 32 are attached to a body under deformation in such a way that the deformation will cause $\phi$ to change its magnitude into $\phi \pm \theta$, then the difference between the two signals $\epsilon(\phi \pm \theta)$ and $\epsilon(\theta)$ may be used to establish the amount of deformation incurred. Since $\epsilon(\phi \pm \theta)$ and $\epsilon(\phi)$ represent two measurements taken at two different times, one method of measurement of the difference signal is to establish a reference signal $\epsilon_0$ such that $\epsilon_0 = \epsilon(\phi)$ and the difference signal $\Delta\epsilon$ becomes:

$$\Delta_1 \epsilon(\theta) = \epsilon(\phi \pm \theta) - \epsilon_0 \quad (6)$$

In order for $\Delta_1\epsilon(\theta)$ to be a meaningful representation of $\Delta\epsilon(\theta)$, it is necessary that $\epsilon_0 = \epsilon(\phi)$ at all times. This means that the constant of proportionality K must be strictly kept a constant.

To achieve this, a second photodetector 37 is used to control the intensity of light. This photodetector 37 receives a part of light from 34. If the optical properties of the polarizers may change with time or may change with temperature, two optional polarizing filters 100 and 101 are inserted along the optical path 105 between the source 34 and the detector 37. The polarization axes of the polarizers 100 and 101 may be inclined at a fixed angle roughly equal to the midrange of variation of $\phi$.

FIG. 10B shows the principle of operation of the embodiment in FIG. 10A. A regulated voltage source 107 is applied to a potentiometer 108, and the voltage at the tapping point 109 is applied to the noninverting input of an operational amplifier 112. The voltage source 107 is applied to a reverse biased photodiode 37 in series with the inverting input 111 of the amplifier 112, and a feedback resistor 106 connects the inverting input 111 and the output 114. In this configuration, the operational amplifier 112 functions as a current-to-voltage converter, converting a current $i_1$ that passes through the photodiode 37, into a voltage $V_{114} = R_{106} i_1$, where $R_{106}$ is the resistance of 106. The voltage source 107 is also applied to another potentiometer 110, and the voltage at the tapping point 115 is fed to the inverting input of a second operational amplifier 113, which functions as a voltage comparator, comparing the output voltage $V_{114}$ and a reference voltage $V_{115}$, which is derived from the tapping point of the potentiometer 110. The output 116 of the amplifier 113 is then fed into the light source 34. $V_{116}$ (the output voltage at 116) is given by the equation:

$$V_{116} = g(V_{114} - V_{115} + V_{off}) \quad (7)$$

where g is the gain factor of the amplifier (in units of volt per volt) and $V_{off}$ is the so-called offset voltage of the amplifier. $V_{off}$ is usually of the order of a few millivolts.

$V_{114}$ is determined by the light output of the source 34, and is a function of the output voltage $V_{116}$. Therefore, Equation (7) becomes:

$$V_{116} = g[V_{114}(V_{116}) - V_{115} + V_{off}] \quad (8)$$

The normal operating voltage of the light source is of the order of a few volts. g is of the order of $10^5$ volts per volt. Therefore Equation (8) essentially becomes:

$$V_{114}(V_{116}) - V_{115} + V_{off} = V_{116}/g \approx 10^{-5} V_{116} \approx \text{ tens of microvolts} \quad (9)$$

That is to say, for all practical purposes $V_{114}(V_{116}) - V_{115} + V_{off} \approx 0$, independent of the value of $V_{116}$: The output voltage $V_{116}$ will adjust itself to generate the intensity of the light source such that Equation (9) is fulfilled.

A photodiode responds to light in the following way: n photons striking at the p-n junction release q·n number of electrons to leak through the reverse biased p-n junction, giving rise to a signal current $i_s = q \cdot n$ (where q is the quantum efficiency). Let the dark current (the leakage current of the reverse biased junction in the absence of light) be $i_e$. In almost all cases of interest $i_s$ is many times greater than $i_e$: $i_s/i_e > 100$, and probably $> 1,000$. Therefore, $$V_{114} = R_{106}(i_e + i_s) \quad (10)$$

Let us now neglect temperature effects on the input offset voltage $V_{off}$ (less than 10 microvolt per degree C.). The the quantity $$R_{106}(i_e + i_s)$$

may be regarded as a constant. An increase (or decrease) in the dark current $i_e$ will cause an equivalent decrease (or increase) in the signal current $i_s$, which is achieved through a change of $V_{116}$. However, through Equation (8) changes of $V_{116}$ are scaled down by a factor of g in affecting the voltage $V_{114}$.

Referring to FIG. 10C, which shows how an analog signal may be extracted from the photodiode 36, a regulated voltage 107 is applied to a potentiometer 124 and the voltage $V_{130}$ at the tapping point is fed to the noninverting input point 130 of a differential operational amplifier 122. The photodiode 36 is connected to the voltage source 107 in a reverse biased mode in series to the inverting input point 128, and a feedback resistor 126 (of value $R_{126}$) is connected between the inverting input point 128 and the output point 132 of the amplifier 122. In this mode, the circuit functions as a current-to-voltage converter, converting the current $i_2$ through the photodiode 36 into a voltage $V_{132}$ at the output point 132. $i_2$ is now given by $$i_2 = i_e' + i_s' \quad (11)$$

where $i_e'$ is the dark current and $i_s'$ is the signal current. The output voltage $V_{132}$ is given by:

$$V_{132} = (1 + g'^{-1})^{-1} \cdot [V_{124} - R_{126} \cdot (i_e' + i_s')] \quad (12)$$

where g' is the gain of the amplifier 122 and g' is also of the order of $10^5$ volt per volt. If the photodiodes 36 and 37 are identical in all respects, then $i_e = i_e'$ throughout the operating temperature range of the apparatus, and since the amount of light that falls upon the two detectors can be made to be approximately the same (by a suitable design), therefore $i_s \sim i_s'$. By virtue of the relationship $i_s + i_e$ constant, the D.C. level of $V_{132}$ will therefore also be a constant, independent of light source and dark current variations. The change in signal level at large outputs will amount to $\Delta i_c/i_s$, which should be much smaller than the ratio $i_c/i_s$.

It should be noted that the input current to the operational amplifiers is assumed to be negligible compared to the signal current.

The two polarizers 100, 101 in FIG. 10A are used to compensate for possible temperature and aging effects of the polarizer materials so that the light that is received by 37 and that by 34 are equally compensated should any aging effect or temperature effect takes place. If these effects are not important, these two polarizers 100 and 101 may be omitted without impairing the performance of the embodiment.

I claim:

1. A displacement transducer for converting displacement into an electrical signal comprising mechanical means whereby a linear displacement applied to a certain part will result in an angular displacement in another part;

means for attaching a first light polarizer to said mechanical means so that said angular displacement will cause the polarization axis of the first polarizer to rotate by an angle equivalent to said angular displacement whereas this angle will be referred to as $\theta$;

a second light polarizer in such a configuration that it is parallel to said first polarizer, that the polarization axis of said first and second polarizers are inclined with respect to each other at an angle referred to as $\phi$, prior to application of aforementioned linear displacement, and that said linear displacement will cause $\phi$ to change by an amount $\theta$;

a first photodetector that receives light from a light source transmitted through said first and second polarizers so that the intensity of transmitted light through said first and second polarizers varies as the angle between said polarization axes varies, resulting in a variation of the output of said first photodetector;

a second photodetector that receives light directly from said light source in a fixed geometrical configuration such that light received by said second photodetector is not affected by said linear displacement;

means of configuring aforementioned first and second polarizers such that the angle $\phi$ is in the general neighbourhood of 45°, that when $\phi$ takes this value, the range of linearity of the variations of the intensity of light that is transmitted through the combination of said first and second polarizers, as a function of the variation of the angle between said polarization axes of said first and second polarizers, is maximally extended;

associated circuitry that enables the intensity of said light source to be rigorously controlled by comparing the output of said second photodetector with a reference, and circuitry that enables the intensity of light received by said first photodetector to be converted into an electric signal.

2. The invention described in claim 1, wherein between said light source and said second photodetector, a third and fourth light polarizers are added, such that said third and fourth polarizers are parallel to each other, that they are in a fixed geometrical configuration with respect to said second photodetector, that polarization axes of said third and fourth polarizers are fixed with respect to each other and to the second photodetector.

3. A system for encoding angular position comprising the invention defined in claim 1, a mechanical part as said mechanical means, and means of attaching said first polarizer on said mechanical part, such that any angular displacement will result in a change of the angle between polarization axes of said first and second polarizers.

4. A torque transducer for measuring torque, comprising the invention defined in claim 1, a shaft as said mechanical means, and means of attaching said first polarizer to said shaft.

5. A load transducer for the measurement of a force or a load, comprising the invention defined in claim 1;

a cantilever beam clamped at one end as said mechanical means, a load point at which a load or force is applied to the cantilever, and means of attaching said first and second polarizers to said cantilever.

6. A load transducer for the measurement of force or a load, comprising the invention defined in claim 5, wherein said light source, said first and second light polarizers, and said means for attaching these components to said cantilever, are all between the cantilever and a base on which said cantilever is erected, and a flexible cover that covers said light source, said first and second light polarizers, and said means for attaching these components to said cantilever.

7. A load transducer for the measurement of force or a load, comprising the invention defined in claim 1;

a beam supported at both ends as said mechanical means;

a load point at which a load or force is applied, and means of attaching said first and second polarizers to said beam.

8. A load transducer for the measurement of force or a load, comprising the invention defined in claim 7, wherein said light source, said first and second light polarizers, and said means for attaching these components to said beam, are all between the beam and a base on which said beam is erected, and a flexible cover that covers said light source, said first and second light polarizers, and said means for attaching these components to said beam.

* * * * *